United States Patent
Chen

(10) Patent No.: US 8,125,191 B2
(45) Date of Patent: Feb. 28, 2012

(54) EARLY WARNING METHOD FOR ABNORMAL STATE OF LITHIUM BATTERY AND RECORDING MEDIUM

(75) Inventor: Chien-Chen Chen, Taipei County (TW)

(73) Assignee: Inventec Appliances Corp., Taipei (TW)

( * ) Notice: Subject to any disclaimer, the term of this patent is extended or adjusted under 35 U.S.C. 154(b) by 519 days.

(21) Appl. No.: 12/345,016

(22) Filed: Dec. 29, 2008

(65) Prior Publication Data

US 2009/0258281 A1 Oct. 15, 2009

(30) Foreign Application Priority Data

Apr. 14, 2008 (TW) .............................. 97113524 A

(51) Int. Cl.
 H02J 7/14 (2006.01)
 G01N 27/42 (2006.01)
 H02H 3/00 (2006.01)
 G01R 31/36 (2006.01)

(52) U.S. Cl. ........ 320/134; 320/132; 320/136; 320/152; 320/157; 324/425; 324/426; 324/427; 324/428; 324/429; 361/78; 361/86; 361/87; 361/88; 361/89; 702/63; 702/64; 702/66

(58) Field of Classification Search .......... 324/425–434; 320/132, 136, 152, 157, 158, 159, 165, 134; 361/78, 86–91.1; 702/63, 64, 66

See application file for complete search history.

(56) References Cited

U.S. PATENT DOCUMENTS

| 5,773,977 A * | 6/1998 | Dougherty | 324/429 |
| 7,498,772 B2 * | 3/2009 | Palladino | 320/132 |
| 7,821,234 B2 * | 10/2010 | Moriya | 320/134 |
| 2004/0239333 A1 * | 12/2004 | Kikuchi | 324/434 |
| 2006/0001403 A1 * | 1/2006 | Yudahira | 320/134 |
| 2006/0261782 A1 * | 11/2006 | Kim et al. | 320/132 |
| 2010/0194398 A1 * | 8/2010 | Kawasumi et al. | 324/430 |

* cited by examiner

*Primary Examiner* — Yalkew Fantu
(74) *Attorney, Agent, or Firm* — Muncy, Geissler, Olds & Lowe, PLLC

(57) ABSTRACT

An early warning method for an abnormal state of a lithium battery and a recording medium applicable to a portable electronic device are provided. The method includes the following steps. A plurality of curves of voltage against electric quantity is obtained according to different predicted average current consumptions of the portable electronic device. An operating average current consumption and an operating electric quantity from a first voltage to a second voltage are obtained when the lithium battery at an operating test state in a unit time. One of the curves of voltage against electric quantity is searched, and a warning electric quantity is obtained in a range from the first voltage to the second voltage. The warning electric quantity is compared with the electric quantity, so as to provide an early warning of an abnormal state.

16 Claims, 2 Drawing Sheets

EARLY WARNING METHOD FOR ABNORMAL STATE OF LITHIUM BATTERY AND RECORDING MEDIUM

CROSS-REFERENCE TO RELATED APPLICATION

This application claims the benefit of Taiwan Patent Application No. 097113524, filed on Apr. 14, 2008, which is hereby incorporated by reference for all purposes as if fully set forth herein.

BACKGROUND OF THE INVENTION

1. Field of Invention

The present invention relates to an early warning method for an abnormal state of a lithium battery and a recording medium, and more particularly to an early warning method and a recording medium for an abnormal state of a lithium battery by using a curve of voltage against electric quantity for different current consuming states.

2. Related Art

Nowadays, the consumer electronic products such as mobile phones, PDAs, or notebook computers all use lithium batteries as a power source. Therefore, the lithium batteries operation safety influences the electronic products overall performance in a certain degree.

Currently, an abnormal state of the lithium battery, such as self-combustion or explosion, sometimes happens due to an improper operation or a storage environment when supplying the electronic product power, thereby causing a considerable hazard to the life, property, and so on of users.

SUMMARY OF THE INVENTION

In viewing of the above, the present invention is directed to an early warning method for an abnormal state of a lithium battery, which monitors in real time whether the lithium battery in use is in an abnormal state.

To solve the above problem, the present invention provides an early warning method for an abnormal state of a lithium battery, which includes the following steps. At least one curve of voltage against electric quantity of a portable electronic device is established through an experiment, and the curve of voltage against electric quantity is stored in a memory of the portable electronic device. Each curve of voltage against electric quantity is corresponding to a predicted average current consumption of a lithium battery disposed in the portable electronic device in an operating state of the portable electronic device. When an early warning procedure for an abnormal state of a lithium battery is executed by the portable electronic device, in a unit time, an operating average current consumption of the lithium battery, and an operating electric quantity from a first voltage to a second voltage are measured. The predicted average current consumption consistent with the operating average current consumption, and the curve of voltage against electric quantity corresponding to the predicted average current consumption are found from the memory of the portable electronic device, and subsequently, a warning electric quantity is obtained from the curve of voltage against electric quantity in a range from the first voltage to the second voltage. When the operating electric quantity is determined to be greater than the warning electric quantity, the portable electronic device sends a warning message to inform a user to react properly. When the operating electric quantity is determined to be not larger than the warning electric quantity, in a unit time, an operating average current consumption of the lithium battery, and an operating electric quantity from the first voltage to the second voltage are measured.

Furthermore, the early warning method for an abnormal state of a lithium battery of the present invention may also be implemented through a recording medium. By reading and executing an early warning program for an abnormal state of a lithium battery recorded in the recording medium, the same method may be used to solve the same problem, and the same efficacy may be achieved.

The early warning method for an abnormal state of a lithium battery and the recording medium of the present invention may monitor in real time whether the voltage or electric quantity of the lithium battery varies too much instantaneously in an operating process, inform the user about the abnormal state in advance, and guarantee the safety of the life and property of users of electronic devices.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In order to make the present invention become more comprehensible, the present invention is illustrated below in detail through relevant embodiments and accompanying drawings.

Figure 1A:
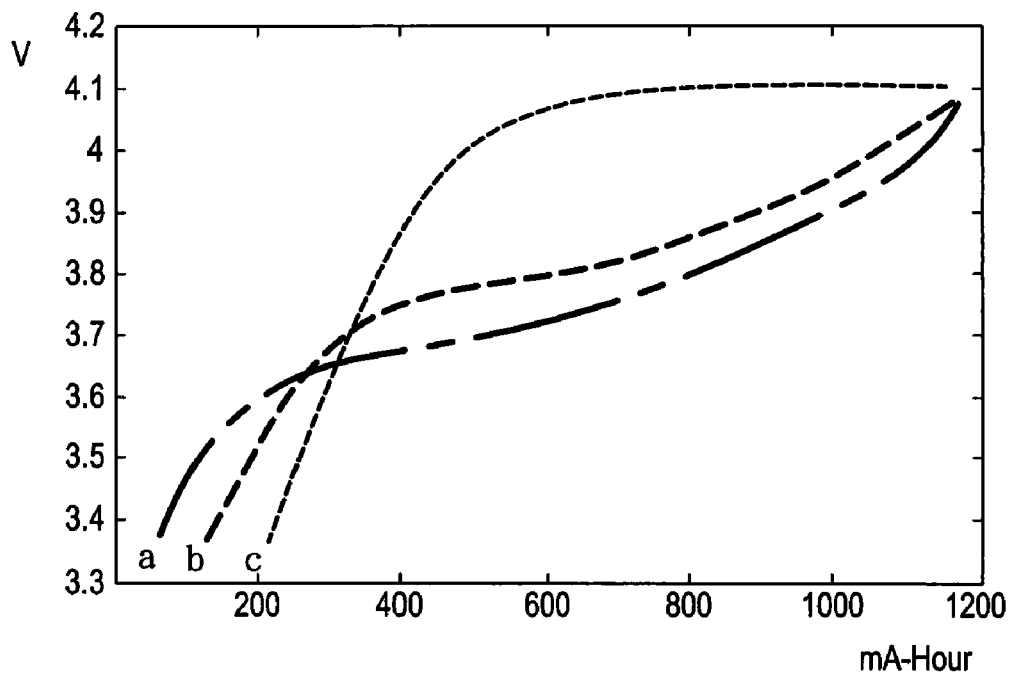
FIG. 1A is a schematic view of the curve of voltage against electric quantity of a lithium battery of an early warning method for an abnormal state of a lithium battery and a recording medium according to an embodiment of the present invention.
Figure 1B:
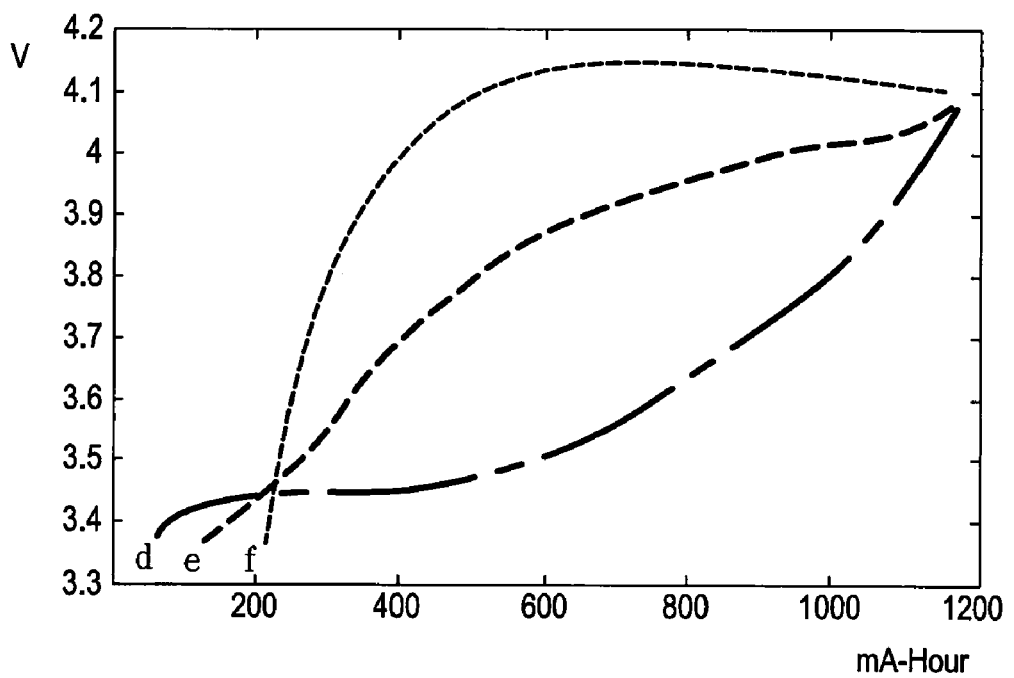
FIG. 1B is a schematic view of the curve of voltage against electric quantity of a lithium battery of the early warning method for an abnormal state of a lithium battery and a recording medium according to an embodiment of the present invention.

FIGS. 1A and 1B are schematic views of the curve of voltage against electric quantity of a lithium battery of an early warning method for an abnormal state of a lithium battery and a recording medium according to an embodiment of the present invention. In FIGS. 1A and 1B, curve a, b, c, d, e, or f represents different curves of voltage against electric quantity at different current consumption, respectively. The X axis is the electric quantity of the lithium battery, ranging from 10% to 100% of the electric quantity, and the Y axis is the voltage of the lithium battery, ranging from a rated voltage to a failure voltage. A current consumption is a current consumed by the portable electronic device, such as a mobile phone or a personal digital assistant (PDA), operating in a state of standby, calling, or running a multimedia program.

Figure 2:
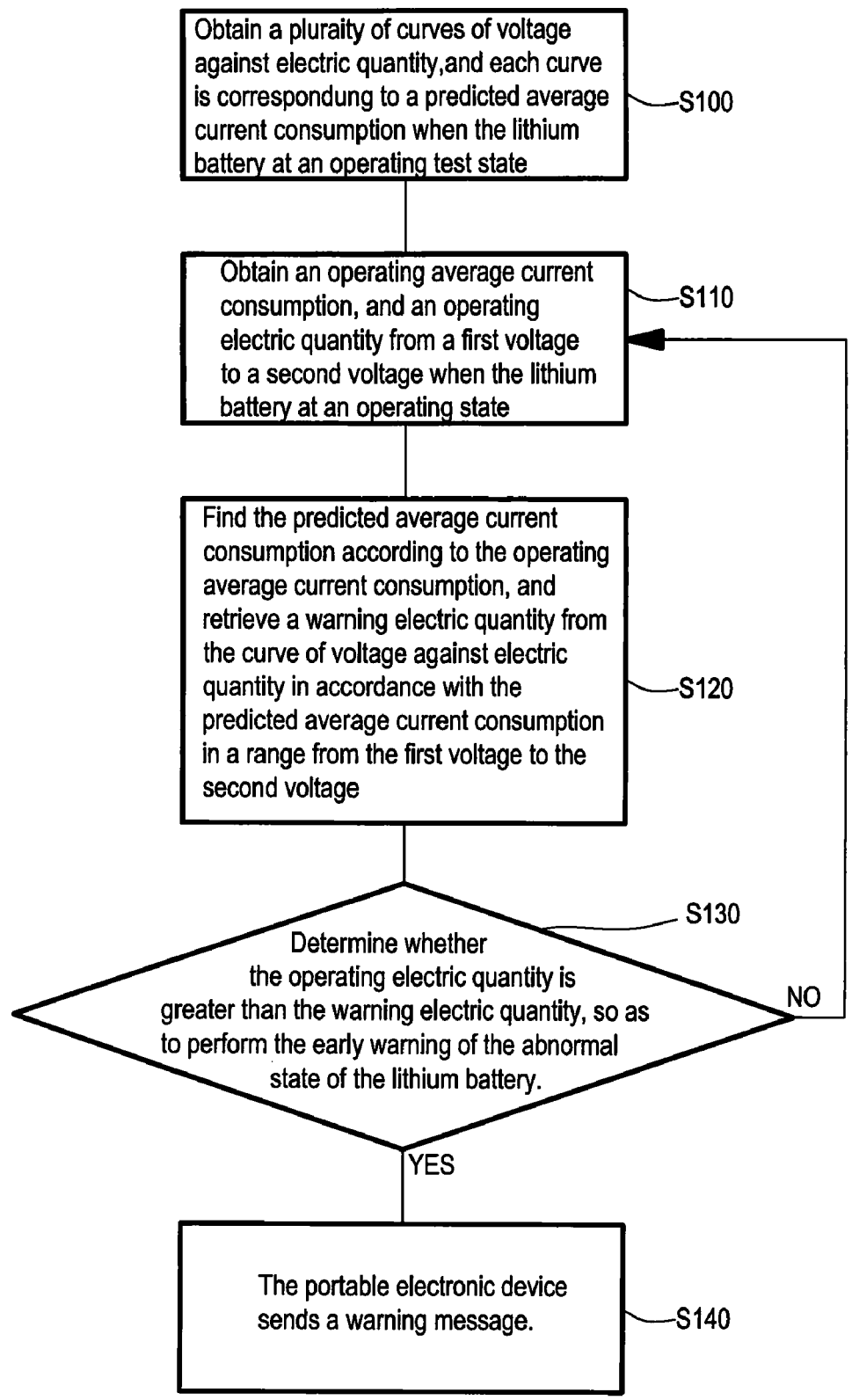
FIG. 2 is a flow chart of the early warning method for an abnormal state of a lithium battery according to an embodiment of the present invention.

FIG. 2 is a flow chart of the early warning method for an abnormal state of a lithium battery according to an embodiment of the present invention, in which the lithium battery is used in a portable electronic device, and the method includes the following steps.

To make the present invention more comprehensible, refer to FIGS. 1A and 1B together.

A plurality of curves of voltage against electric quantity is obtained, and each curve is corresponding to a predicted average current consumption of the lithium battery in an operating test state, respectively (step S100). The portable electronic device is often operated in different states with different current consumptions, and there is also some difference in the voltage and electric quantity of the lithium battery. Therefore, the predicted average current consumptions at various operating states of the portable electronic device and the corresponding curve of voltage against electric quantity of the lithium battery are simulated through an experiment at first, and are stored in a memory of the portable electronic device as a reference for the early warning for the abnormal state of the lithium battery.

An operating average current consumption, and an operating electric quantity from a first voltage to a second voltage when the lithium battery at an operating state are obtained (step S110). Based on a unit time, a control chip of the portable electronic device measures the operating average current consumption, and measures the electric quantity from the first voltage to the second voltage, in which the unit time may be, for example, 5.12 seconds or may be determined on demand. Here, the first voltage is a voltage measured at a start time point of the unit time, and the second voltage is a voltage measured at an end time point of the unit time.

The predicted average current consumption consistent with the operating average current consumption is found, and a warning electric quantity is retrieved from the curve of voltage against electric quantity in accordance with the predicted average current consumption in a range from the first voltage to the second voltage (step S120). In detail, the portable electronic device finds the predicted average current consumption consistent with the operating average current consumption, and a curve of voltage against electric quantity corresponding to the predicted average current consumption is found from the memory of the portable electronic device, and obtains the warning electric quantity in the curve of voltage against electric quantity according to the range from the first voltage and the second voltage.

A comparison is made to determine whether the electric quantity is greater than the warning electric quantity, so as to perform the early warning for the abnormal state of the lithium battery (step S130).

The portable electronic device sends a warning message when the electric quantity is greater than the warning electric quantity (step S140). If the operating electric quantity is greater than the warning electric quantity, it indicates that the lithium battery is possible to result in an abnormal state, such as self-combustion or explosion, and the portable electronic device displays the warning message to inform the user in time. The warning message may be presented through characters, vibration, or sound. Otherwise, return to the step S110 when the electric quantity is not greater than the warning electric quantity.

The embodiment of the early warning method for an abnormal state of a lithium battery may also be implemented through a recording medium. By reading an early warning program for an abnormal state of a lithium battery recorded in the recording medium for execution, the same method may be used to solve the same problem, and the same efficacy may be achieved.

To sum up, according to the early warning method for an abnormal state of a lithium battery of the present invention, a curve of voltage against electric quantity of the lithium battery in at least one current consuming state of the portable electronic device is established at first, and variances in the voltage and the electric quantity in a unit time in an operating state of the lithium battery are then obtained for comparison, so as to remind the user in advance that the lithium battery may be in an abnormal state such as self-combustion or explosion, thereby guaranteeing the safety of the battery in use.

The above descriptions are only illustrative, but not intended to limit the present invention. Various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An early warning method for an abnormal state of a lithium battery, applicable to a portable electronic device having the lithium battery, comprising:

obtaining at least one curve of voltage against electric quantity by the portable electronic device, the portable electronic device saving the curve of voltage against electric quantity in a memory of the portable electronic device, the curve of voltage against electric quantity corresponding to a predicted average current consumption when the lithium battery is at an operating test state;

obtaining an operating average current consumption, and an operating electric quantity from a first voltage to a second voltage by the portable electronic device when the lithium battery is at an operating state;

the portable electronic device finding the predicted average current consumption, finding the curve of voltage against electric quantity which is against the operating average current consumption through the memory, according to the operating average current consumption, and retrieving a warning electric quantity from the curve of voltage against electric quantity in accordance with the predicted average current consumption in a range from the first voltage to the second voltage; and determining whether the operating electric quantity is greater than the warning electric quantity by the portable electronic device, so as to perform the early warning of the abnormal state of the lithium battery.

2. The early warning method for an abnormal state of a lithium battery according to claim 1, wherein the step of determining whether the operating electric quantity is greater than the warning electric quantity by the portable electronic device further comprises:

sending a warning message from the portable electronic device when the operating electric quantity is greater than the warning electric quantity.

3. The early warning method for an abnormal state of a lithium battery according to claim 2, wherein the warning message is presented on the portable electronic device through a character.

4. The early warning method for an abnormal state of a lithium battery according to claim 2, wherein the warning message is presented on the portable electronic device through a vibration.

5. The early warning method for an abnormal state of a lithium battery according to claim 2, wherein the warning message is presented on the portable electronic device through a sound.

6. The early warning method for an abnormal state of a lithium battery according to claim 1, wherein a voltage in the curve of voltage against electric quantity is ranged from a rated voltage to a failure voltage of the lithium battery.

7. The early warning method for an abnormal state of a lithium battery according to claim 1, wherein a electric quantity in the curve of the voltage against electric quantity is ranged from 10% to 100% of the lithium battery electric quantity.

8. The early warning method for an abnormal state of a lithium battery according to claim 1, wherein the early warning for the abnormal state of the lithium battery is an early warning about an explosion state or a self-combustion state of the lithium battery.

9. A recording medium readable by an electronic device, wherein an early warning program for an abnormal state of a lithium battery applicable a portable electronic device is recorded on the recording medium, the recording medium executing the following procedures:

obtaining at least one curve of voltage against electric quantity by the portable electronic device, the portable electronic device saving the curve of voltage against electric quantity in a memory of the portable electronic device, the curve of voltage against electric quantity corresponding to a predicted average current consumption when the lithium battery is at an operating test state;

obtaining an operating average current consumption, and an operating electric quantity from a first voltage to a second voltage by the portable electronic device when the lithium battery is at an operating state;

the portable electronic device finding the predicted average current consumption according to the operating average current consumption, finding the curve of voltage against electric quantity which is against the operating average current consumption through the memory, and retrieving a warning electric quantity from the curve of voltage against electric quantity in accordance with the predicted average current consumption in a range from the first voltage to the second voltage; and determining whether the operating electric quantity is greater than the warning electric quantity by the portable electronic device, so as to perform the early warning of the abnormal state of the lithium battery.

10. The recording medium readable by the electronic device according to claim 9, wherein the step of determining whether the operating electric quantity is greater than the warning electric quantity by the portable electronic device further comprises:

sending a warning message from the portable electronic device when the operating electric quantity is greater than the warning electric quantity.

11. The recording medium readable by the electronic device according to claim 10, wherein the warning message is presented on the portable electronic device through a character.

12. The recording medium readable by the electronic device according to claim 10, wherein the warning message is presented on the portable electronic device through a vibration.

13. The recording medium readable by the electronic device according to claim 10, wherein the warning message is presented on the portable electronic device through a sound.

14. The recording medium readable by the electronic device according to claim 9, wherein a voltage in the curve of voltage against electric quantity is ranged from a rated voltage to a failure voltage of the lithium battery.

15. The recording medium readable by the electronic device according to claim 9, wherein an electric quantity in the curve of the voltage against electric quantity is ranged from 10% to 100% of an electric quantity of the lithium battery.

16. The recording medium readable by the electronic device according to claim 9, wherein the early warning for the abnormal state of the lithium battery is an early warning about an explosion state or a self-combustion state of the lithium battery.

* * * * *